Sept. 18, 1951     S. I. RAMBO     2,568,410
RADIO FREQUENCY APPARATUS
Filed June 11, 1948
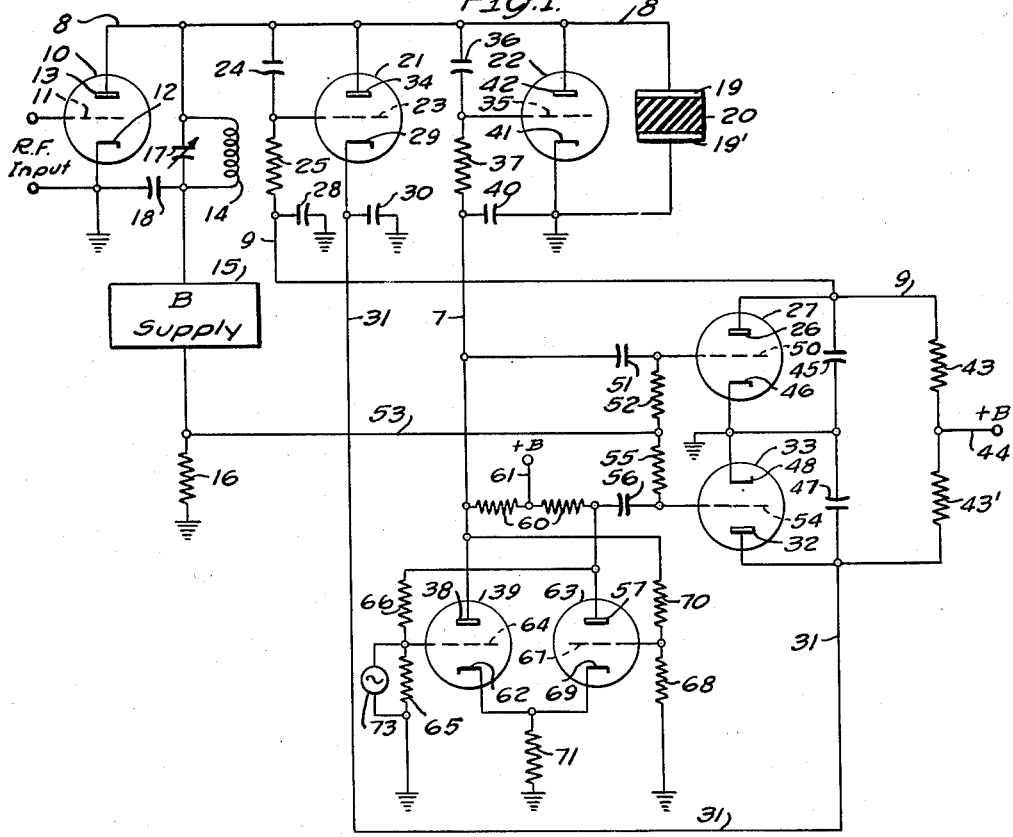
Fig. 1.
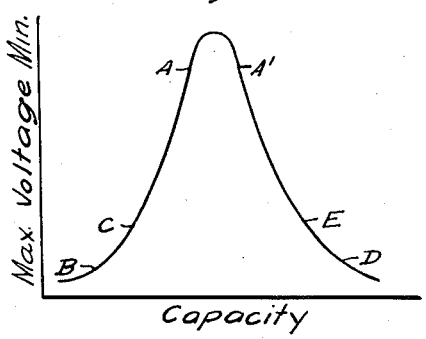
Fig. 2.
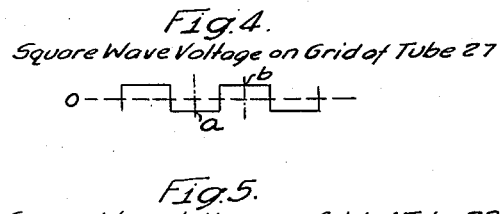
Fig. 3.
Square Wave Voltage on Grid of Tube 22
Fig. 4.
Square Wave Voltage on Grid of Tube 27
Fig. 5.
Square Wave Voltage on Grid of Tube 33
WITNESSES:
E. A. McCloskey.
Leon M. Garman
INVENTOR
Sheldon I. Rambo.
BY
F. E. Browder
ATTORNEY Patented Sept. 18, 1951

2,568,410

UNITED STATES PATENT OFFICE 2,568,410

RADIO FREQUENCY APPARATUS

Sheldon I. Rambo, Baltimore, Md., assignor to Westinghouse Electric Corporation, East Pittsburgh, Pa., a corporation of Pennsylvania Application June 11, 1948, Serial No. 32,373

11 Claims. (Cl. 250—40)

This invention relates to radio frequency generators, and relates more particularly to electronic controls for automatically maintaining the output circuits of such generators tuned to resonance.

In radio frequency generators such, for example, as thermionic oscillators used for heating materials, the load circuits may be thrown off resonance as the electrical properties of the material being heated change as a result of the heating. By way of example, when a dielectric load is heated by hysteresis in an electrostatic field produced by a radio frequency generator, its electrical capacity will change during the heating causing the load circuit to be thrown off resonance. This will result in an undesired loss in efficiency.

It has been proposed to maintain a load circuit of a radio frequency generator tuned automatically to resonance by controls including a motor driven, frequency wobbler condenser, and a commutator switch driven therewith, a motor driven retuning condenser, and relays actuated through the operation of the wobbler condenser and the commutator switch, for operating the retuning condenser. See the United States patents to Reifel et al., No. 2,415,799, and Crandell, No. 2,458,684, for prior art examples of similar systems. A disadvantage of such a control system is that it requires two motors for driving the variable condensers, and two relays, these components being subject to all of the inherent troubles of mechanical motion. Such a combined electrical and mechanical system has the additional disadvantage of being subject to hunting which prevents a high degree of accuracy of control.

This invention provides a control system for automatically maintaining the output circuit of a radio frequency generator tuned to resonance, which is completely electronic and uses no moving parts. A thermionic reactance tube is used for tuning an output circuit to resonance, another reactance tube is used as a frequency wobbler, and an electronic switch is used with the frequency wobbler for causing the reactance and effective capacitance of the reactance tube which tunes the output circuit, to vary when the output circuit is off resonance so that it is retuned to resonance.

This invention may be used for automatically restoring a load circuit to resonance at a fixed frequency when load or other changes have caused it to be thrown off resonance, or it may be used for causing a load or other output circuit connected to a radio frequency generator, to track therewith when the frequency of the generator is changed.

An object of the invention is to use a thermionic tube as a variable reactance for automatically retuning an electrical circuit to resonance when it departs therefrom.

Another object of the invention is to use a thermionic tube as a variable reactance for automatically restoring an output circuit of a radio frequency generator to resonance when load changes have caused it to depart from resonance.

Another object of the invention is to use a thermionic tube as a variable reactance for causing an output circuit of a radio frequency generator to track therewith when its frequency is changed.

The invention will now be described with reference to the drawing of which:

Fig. 1 is a circuit schematic illustrating this invention as embodied in an output circuit of a radio frequency generator;

Fig. 2 is a chart illustrating the resonance curve of the output circuit of Fig. 1;

Fig. 3 is a chart illustrating the wave form of the voltage from the electronic switch which biases the grid of the reactance tube of Fig. 1 which acts as a frequency wobbler;

Fig. 4 is a chart illustrating the wave form of the voltage from the electronic switch which is applied to the grid of one of the control tubes of Fig. 1, and Fig. 5 is a chart illustrating the wave form of the voltage from the electronic switch which is applied to the control grid of the other control tube of Fig. 1.

The square wave voltage forms of Figs. 3, 4, and 5 are drawn in alignment with respect to time so that their phase relations with respect to each other are illustrated.

The radio frequency amplifier tube 10 has its grid 11 and cathode 12 connected to the output of a radio frequency oscillator tube which is not illustrated. The plate 13 of the tube 10 is connected through the tank coil 14 to the plus side of a plate voltage supply source 15, the negative side of which is connected through the resistor 16 to ground. The coil 14 has the tuning condenser 17 shunted thereacross. The condenser 18 completes the radio frequency path from the plate 13 to the cathode 12 of the tube 10.

The work heating electrode 19 is connected through the wiring 8 to the plate 13 of the tube 10, and the work heating electrode 19' is connected to ground. The work or article 20, which may be a plastic to be heated by hysteresis action, is held between the electrodes 19 and 19'.

The reactance tubes 21 and 22, which may be, for example, 6AG7s, or WL895s or the like, are shunted across the tank circuit of the tube 10. The grid 23 of the tube 21 is connected through the condenser 24 and the wiring 8 to the plate 13 of the tube 10, and is connected through the resistor 25 and the wiring 9 to the plate 26 of the control tube 27, and through the resistor 25 and the condenser 28, to ground. The cathode 29 of the tube 21 is connected through the bypass condenser 30 to ground, and through the wiring 31 to the plate 32 of the control tube 33. The plate 34 of the reactance tube 21 is connected through the wiring 8 to the plate 13 of the tube 10. The resistor 25 and the condenser 24 form a phase shift circuit so that the effective reactance between anode 34 and cathode 29 of the tube 21 varies with the bias voltage applied between its grid 23 and its cathode 29.

The grid 35 of the reactance tube 22 is connected through the condenser 36 and the wiring 8 to the plate 13 of the tube 10, is connected through the resistor 37 and the wire 7 to the plate 38 of the switching tube 39, and is connected through the resistor 37 and the condenser 40 to the cathode 41 of the reactance tube 22, and to ground. The plate 42 of the reactance tube 22 is connected through the wiring 8 to the plate 13 of the tube 10. The resistor 37 and the condenser 36 form a phase shift circuit so that the effective reactance of the tube 22 in the tank circuit varies with the bias voltage applied between its grid 35 and its cathode 41.

The plate 26 of the control tube 27, and the plate 32 of the control tube 33 are connected together through the series resistances 43 and 43', the mid-point connection of which is connected through the wire 44 to the plus side of a conventional plate voltage supply source which is not illustrated. The filter condenser 45 is connected between the plate 26 and the cathode 46 of the tube 27. A similar filter condenser 47 is connected between the plate 32 and the cathode 48 of the tube 33. The cathodes 46 and 48 are connected together and to ground. The voltages developed across the resistors 43 and 43' are applied through the wiring 9 and 31 to the grid 23 and the cathode 29 of the tube 21.

The grid 50 of the control tube 27 is connected through the coupling condenser 51 to the plate 38 of the switching tube 39, and is connected through the resistor 52 and the wire 53 to the ungrounded side of the resistor 16.

The grid 54 of the control tube 33 is connected through the resistor 55 and the wire 53 to the ungrounded side of the resistor 16, and is connected through the coupling condenser 56 to the plate 57 of the switching tube 63.

The plate 38 of the switching tube 39 and the plate 57 of the switching tube 63 are connected together through the series resistors 60, the mid-point connection of which is connected through the wire 61 to the plus side of a conventional plate voltage supply source which is not illustrated. The cathodes 62 and 69 of the tubes 39 and 63, respectively, are connected together and through the bias resistor 71 to ground.

The grid 64 of the tube 39 is connected to ground through the grid resistor 65, and is connected through the resistor 66 to the plate 57 of the tube 63.

The grid 67 of the tubes 63 is connected through the grid resistor 68 to ground, and is connected through the resistor 70 to the plate 38 of the tube 39.

The switching tubes 39 and 63 are connected in a square wave generating circuit of the conventional Eccles-Jordon trigger circuit type. The alternating current source 73, which may be a conventional audio oscillator, applies alternating current voltages at a frequency, which may be about 30 cycles per second, across the grid resistor 65 of the tube 39.

The wave form of the resulting voltage at the plate 38 of the tube 39, is shown by Fig. 3. This square wave voltage is applied through the wire 7 and the resistor 37 to the grid 35 of the reactance tube 22 as a varying bias voltage which varies the reactance of the tube 22 at the frequency of the generator 73. This variation in reactance of the tube 22 causes its apparent capacitance across the tank circuit to vary so as to slightly detune the tank circuit first to one side and then to the other side of resonance, the effect being the same as the rotation of a conventional frequency wobbler condenser.

The wave form of the voltage from the square wave generator at the grid 50 of the control tube 27 is illustrated by Fig. 4. This square wave voltage biases the grid 50 of the tube 27.

The wave form of the voltage from the square wave generator at the grid 54 of the control tube 33 is illustrated by Fig. 5. This voltage is 180° out of phase with that of the grid 50 of the tube 27 and biases the grid 54 of the tube 33.

The voltage drop across the resistor 16 caused by the flow of the plate current of the tube 10 therethrough, is applied through the wire 53 and the resistors 52 and 55 as bias voltages on the grids 50 and 54 of the tubes 27 and 33, respectively. Changes in these bias voltages will cause changes in the plate currents of the tubes and will cause changes in the voltage drops across the plate resistors 43 and 43'.

The difference between the voltages appearing across the plate resistors 43 and 43' resulting from the difference between the plate currents of the tubes 27 and 33, is filtered by the condensers 45 and 47, and is used to change the normal bias voltage between the grid 23 and the cathode 29 of the reactance tube 21, the changes in this bias voltage causing corresponding changes in the reactance of the tube 21, and causing changes in its apparent capacity across the tank circuit of the tube 10. The circuit constants are so chosen that the tube 21 will be effective to retune the tank circuit to resonance to compensate for any probable detuning thereof.

In operation, the tank circuit of the tube 10 supplies alternating electrostatic fields between the electrodes 19 and 19' causing the work article 20 to be heated by hysteresis. If the tank circuit of the tube 10 is thrown off resonance for any reason, its plate current will change and will cause resulting voltage drops across the resistor 16 through which the plate current flows.

Referring now to Figs. 2, 3, 4 and 5, when the square wave voltage is at the instant a (Fig. 3), the bias on the grid of the reactance tube 22 will be negative so that its apparent capacitance across the tank circuit will be minimum. If the tank circuit is at that time on the low capacitance side of resonance, the voltage across the resistor 16 may be at B on the resonance curve of Fig. 2 at the start of the retuning. This voltage will provide through the wire 53, a corresponding bias on the grids of the control tubes 27 and 33. Since at the same instant $a$ (Fig. 4), the square wave bias voltage on the grid of the tube 27 will be negative, and at the same instant $a$ (Fig. 5), the square wave bias voltage on the grid of the tube 33 will be positive, the tube 33 will be biased more positively and will draw more plate current than the tube 27.

At the instant $b$ (Fig. 3), the bias on the grid of the reactance tube 22 will be positive so that its apparent capacitance across the tank circuit will be maximum. Then, the voltage drop across the resistor 16 will be less since the tank circuit has been brought nearer resonance and may be that shown at C on the resonance curve of Fig. 2 at the start of the retuning. This will decrease the bias voltage from the resistor 16 on the grids of the tubes 27 and 33. Since, at the same instant $b$ (Fig. 4), the square wave voltage bias on the grid of the tube 27 will be positive and the square wave bias on the grid of the tube 33 will be negative (Fig. 5), the tube 27 will draw more plate current than the tube 33. However, the plate current drawn by the tube 27 at the instant $b$ will be greater than that drawn by the tube 33 at the instant $a$ because the common bias on the grids of both tubes resulting from the voltage drop across the resistor 16 will be less at the instant $b$. As a result, there will be a net difference in the plate currents of the tubes 27 and 33 during continued cycles, corresponding to the difference between the points B and C on the resonance curve of Fig. 2.

The increased plate current drawn by the tube 33 will cause an increased voltage drop across the resistor 43', resulting in the plate 32 of the tube 33 becoming less positive and causing through the wiring 31, the cathode 29 of the tube 21 to become less positive. At the same time the reduced plate current drawn by the tube 27 will cause a reduced voltage drop across its plate resistor 43, resulting in the plate 26 of the tube 27 becoming more positive and causing through the wiring 9 and the resistor 25, the grid 23 of the tube 21 to become more positive. As a result, the grid 23 of the reactance tube 21 will be biased more positively than when the tank circuit is at resonance so that its apparent capacitance across the tank circuit will increase so that it will act to restore the tank circuit to resonance.

When the tank circuit is off resonance on the high capacitance side, the voltages across the resistor 16 may vary between that shown at D and that shown at E on the resonance curve of Fig. 2 at the start of the retuning, the voltage D being that when the tank circuit is furthest from resonance and the voltage E being that when the tank circuit is nearest resonance during the cycling of the square wave generator. When the square wave voltage is at the instant $b$ (Fig. 3), the bias on the grid of the reactance tube 22 will be positive so that its apparent capacitance across the tank circuit will be maximum at the same time the voltage across the resistor 16 is at D on the resonance curve of Fig. 2. At the same instant $b$ (Fig. 4), the square wave bias voltage on the grid of the tube 27 will be positive, and at the same instant $b$ (Fig. 5), the square wave bias voltage on the grid of the tube 33 will be negative. The net biases provided by the voltage across the resistor 16 and the square wave bias voltages will result in the grid of the tube 27 being biased more positive than that of the tube 33 at this time, the tube 27 then drawing more plate current than the tube 33.

At the instant $a$ (Fig. 3), the bias on the grid of the reactance tube 22 will be negative so that its apparent capacitance across the tank circuit will be minimum. Then, the voltage drop across the resistor 16 will be less since the tank circuit has been brought nearer resonance and may be that at E on the curve of Fig. 2. This will decrease the bias voltages on the grids of the tubes 27 and 33. Since, at the same instant $a$ (Fig. 4), the square wave voltage bias on the grid of the tube 27 will be negative and the square wave voltage bias on the grid of the tube 33 will be positive (Fig. 5), the tube 33 will draw more plate current than the tube 27. However, the plate current drawn by the tube 33 at the instant $a$ will be greater than that drawn by the tube 27 at the instant $b$, because the common bias on the grids of both tubes resulting from the voltage drop across the resistor 16 will be less at the instant $a$. As a result, there will be a net difference in the plate currents of the tubes 27 and 33 during continued cycles, corresponding to the difference between the points D and E on the resonance curve, developed across the control tube plate resistor 43 and 43'.

The increased plate current drawn by the tube 27 will cause an increased voltage drop across its plate resistor 43, resulting in the plate 26 of the tube 27 becoming less positive and causing through the wiring 9 and the resistor 25, the grid 23 of the tube 21 to become less positive. At the same time the reduced plate current drawn by the tube 33 will cause a reduced voltage drop through its plate resistor 43'; resulting in the plate 32 of the tube 33 becoming more positive and causing through the wiring 31, the cathode 29 of the tube 21 to become less positive. As a result, the grid of the reactance tube 21 will be biased less positively than when the tank circuit is at resonance, whereby its apparent capacitance across the tank circuit will be less so that it will act to restore the tank circuit to resonance.

When the tank circuit is at resonance, the voltages developed across the resistor 16 during the cycling of the square wave generator may vary between the point A and A' on the resonance curve of Fig. 2. These voltages are equal so that the net voltages applied to the grids of the control tubes 27 and 33 will not change during the cycling. There will be, therefore, no difference voltages across the control tube plate resistors 43 and 43', and no change in the bias voltage on the grid of the tube 21, so that its reactance and apparent capacitance will not change so long as the tank circuit is in resonance.

While in the foregoing explanation the invention has been described as restoring a tank circuit of a fixed frequency radio frequency generator to resonance when it has been detuned from resonance by load or other changes, the invention will operate in the same manner to cause an output circuit of a radio frequency generator to track with same when its frequency is changed. A shift in the frequency of the radio frequency generator will cause its output circuit or circuits to be off resonance at the new frequency, and this invention will act to tune the output circuit or circuits to resonance at the new frequency by the same operation as described in the foregoing.

Output circuits which could be tuned to resonance by this invention, would include buffer amplifiers, radio frequency amplifiers, antenna tuning systems, and other load tuning sytems.

I claim as my invention:

1. Radio frequency apparatus comprising a thermionic tube having a cathode and a plate, and having a tunable output circuit connecting thereto; means for establishing direct current flow between said cathode and plate; a second thermionic tube having electrodes connected to said output circuit; and means including means responsive to variations in said direct current flow for varying the reactance of said second tube in said output circuit until same is tuned to resonance thereby.

2. Radio frequency apparatus comprising a thermionic tube having a cathode and a plate, and having a tunable output circuit connecting thereto; means for establishing direct current flow between said cathode and plate; a second thermionic tube having a grid, a cathode, and a plate so connected to said output circuit that a change in the bias on its grid varies its reactance in said circuit; and means including means responsive to variations in said direct current flow for applying varying bias voltages to said grid for varying the reactance of said second tube in said output circuit until same is tuned to resonance thereby.

3. Radio frequency apparatus comprising a thermionic tube having a cathode and a plate, and having a tunable output circuit connecting thereto; means for establishing direct current flow between said cathode and plate; a second thermionic tube having a grid, a cathode and a plate; means connecting said cathode and plate of said second tube to the opposite sides of said output circuit; means connecting said grid in a phase-shifting circuit across said output circuit; and means including means responsive to variations in said direct current flow for applying varying bias voltages to said grid for varying the reactance of said second tube in said output circuit until same is tuned to resonance thereby.

4. Radio frequency apparatus comprising a thermionic tube having a cathode and a plate, and having a tunable output circuit connecting thereto; means for establishing direct current flow between said cathode and plate; a second thermionic tube having a grid, a cathode and a plate; means connecting said cathode and plate of said second tube to the opposite sides of said output circuit; means connecting said grid in a phase-shifting circuit across said output circuit; means for detuning said output circuit alternately from one side to the other side of resonance; and means including means responsive to variations in said direct current flow for applying varying bias voltages to said grid for varying the reactance of said second tube in said output circuit until same is tuned to resonance.

5. Radio frequency apparatus comprising a thermionic tube having a cathode and a plate, and having a tunable output circuit connecting thereto; means for establishing direct current flow between said cathode and plate; a second thermionic tube having a grid, a plate and a cathode; means connecting said cathode and plate of said second tube to the opposite sides of said output circuit; means connecting said grid in a phase-shifting circuit across said output circuit; a pair of control tubes each having a grid, a cathode, and a plate; means connecting the plate of one control tube to the grid of said second thermionic tube and connecting the cathode of the other of said control tubes to the cathode of said second thermionic tube; and means including said control tubes, and including means responsive to variations in said direct current flow for applying varying bias voltages to said grid of said second tube for varying the reactance of same until said output circuit is tuned to resonance.

6. Radio frequency apparatus comprising a thermionic tube having a cathode and a plate, and having a tunable output circuit connecting thereto; means for establishing direct current flow between said cathode and plate; a second thermionic tube having a grid, a cathode, and a plate; means connecting said cathode and plate of said second tube to the opposite sides of said output circuit; means connecting said grid in a phase-shifting circuit across said output circuit; a pair of control tubes each having a grid, a cathode, and an anode; means connecting the plate of one control tube to the grid of said second thermionic tube and connecting the cathode of the other of said control tubes to the cathode of said second thermionic tube; means for detuning said output circuit alternately from one side to the other side of resonance; and means including said control tubes, and including means responsive to variations in said direct current flow for applying varying bias voltages to said grid of said second tube for varying the reactance of same in said output circuit until same is tuned to resonance.

7. Radio frequency apparatus as claimed in claim 5 in which the means for detuning the output circuit includes a third thermionic tube having electrodes connected in the output circuit.

8. Radio frequency apparatus comprising a thermionic tube having a cathode and a plate, and having a tunable output circuit connecting thereto; means for establishing direct current flow between said cathode and plate; a second thermionic tube having a grid, a plate and a cathode; means connecting said cathode and plate of said second tube to the opposite sides of said output circuit; means connecting said grid in a phase-shifting circuit across said output circuit; a pair of control tubes each having a grid, a cathode, and a plate; means connecting the plate of one control tube to the grid of said second thermionic tube and connecting the cathode of the other of said control tubes to the cathode of said second thermionic tube; a generator for applying bias voltages 180° out of phase to the grids of said control tubes; and means including said control tubes; and including means responsive to variations in said direct current flow for applying varying bias voltages to said grid of said second tube until said output circuit is tuned to resonance.

9. Radio frequency apparatus comprising a thermionic tube having a cathode and a plate, and having a tunable output circuit connecting thereto; means for establishing direct current flow between said cathode and plate; a second thermionic tube having a grid, a plate and a cathode; means connecting said cathode and plate of said second tube to the opposite sides of said output circuit; means connecting said grid in a phase-shifting circuit across said output circuit; a pair of control tubes each having a grid, a cathode, and a plate; means connecting the plate of one control tube to the grid of said second thermionic tube and connecting the cathode of the other of said control tubes to the cathodes of said second thermionic tube; means for detuning said output circuit alternately from one side to the other side of resonance; a generator for applying bias voltages 180° out of phase to the grids of said control tubes; and means including said control tubes, and including means responsive to variations in said direct current flow for applying varying bias voltages to said grid of said second tube until said output circuit is tuned to resonance.

10. Radio frequency apparatus comprising a thermionic tube having a cathode and a plate, and having a tunable output circuit connecting thereto; means for establishing direct current flow between said cathode and plate; a second thermionic tube having a grid, a plate and a cathode; means connecting said cathode and plate of said second tube to the opposite sides of said output circuit; means connecting said grid in a phase-shifting circuit across said output circuit; a pair of control tubes each having a grid, a cathode, and a plate; means connecting the plate of one control tube to the grid of said second thermionic tube and connecting the cathode of the other of said control tubes to the cathode of said second thermionic tube; a third thermionic tube having a cathode and a plate connected to the opposite sides of said output circuit and having a grid connected in a phase-shifting circuit across said output circuit; a generator for applying bias voltages in phase to the grid of said third tube and to the grid of one of said control tubes, and for applying bias voltage 180° out of phase with said bias voltages to the grid of the other control tube, and means responsive to variations in said direct current flow for applying other bias voltages to said grids of said control tubes.

11. Radio frequency apparatus comprising a thermionic tube having a cathode and a plate, and having a tunable output circuit connecting thereto; means for establishing direct current flow between said cathode and plate; a second thermionic tube having a grid, a plate and a cathode; means connecting said cathode and plate of said second tube to the opposite sides of said output circuit; means connecting said grid in a phase-shifting circuit across said output circuit; a pair of control tubes each having a grid, a cathode and a plate; means connecting the plate of one control tube to the grid of said second thermionic tube and connecting the cathode of the other of said control tubes to the cathode of said second thermionic tube; a third thermionic tube having a cathode and a plate connected to the opposite sides of said output circuit and having a grid; means connecting said last-mentioned grid in a phase-shifting circuit across said output circuit; a square wave generator having its output connected to supply square wave bias voltages in phase to the grid of said third tube and to the grid of said one control tube, and to supply square wave bias voltages 180° out of phase with said bias voltages to the grid of the other control tube; means for applying alternating current voltages to the input of said generator, and means responsive to variations in said direct current flow for applying other bias voltages to said grids of said control tubes.

SHELDON I. RAMBO.

REFERENCES CITED

The following references are of record in the file of this patent:

UNITED STATES PATENTS

| Number | Name | Date |
|---|---|---|
| 2,351,368 | Roberts | June 13, 1944 |
| 2,382,436 | Marble | Aug. 14, 1945 |
| 2,383,848 | Crosby | Aug. 28, 1945 |
| 2,415,799 | Reifel et al. | Feb. 11, 1947 |
| 2,434,293 | Stearns | Jan. 13, 1948 |
| 2,458,684 | Crandell | Jan. 11, 1949 |